(12) United States Patent
Soto

(10) Patent No.: US 7,854,107 B2
(45) Date of Patent: Dec. 21, 2010

(54) SUBSTANTIALLY CLOSED SYSTEM FOR SAFELY DISPOSING POTENTIALLY HAZARDOUS MATERIAL

(75) Inventor: Louis M. Soto, 3289 SW. 175th Ave., Miramar, FL (US) 33029

(73) Assignee: Louis M. Soto, Miramar, FL (US)

(*) Notice: Subject to any disclaimer, the term of this patent is extended or adjusted under 35 U.S.C. 154(b) by 519 days.

(21) Appl. No.: 11/946,283

(22) Filed: Nov. 28, 2007

(65) Prior Publication Data
US 2009/0134165 A1 May 28, 2009

(51) Int. Cl.
*B65B 31/02* (2006.01)
*B65B 25/00* (2006.01)

(52) U.S. Cl. .................. 53/512; 53/284.7; 312/1; 588/900

(58) Field of Classification Search .......... 53/510, 53/512, 284.7; 312/1; 588/249.5, 900; B65B 25/00, B65B 29/00, 31/02
See application file for complete search history.

(56) References Cited

U.S. PATENT DOCUMENTS

| | | | | |
|---|---|---|---|---|
| 3,511,022 A | * | 5/1970 | Finley et al. | 53/512 |
| 3,596,429 A | * | 8/1971 | Vogt | 53/67 |
| 4,297,827 A | * | 11/1981 | Allison | 53/282 |
| 4,592,192 A | * | 6/1986 | Jacob et al. | 53/512 |
| 4,991,633 A | * | 2/1991 | Wong | 141/5 |
| 5,005,496 A | | 4/1991 | Nagata | |
| 5,054,696 A | | 10/1991 | Mennel et al. | |
| 5,178,828 A | * | 1/1993 | Uesugi | 422/22 |
| 5,511,594 A | * | 4/1996 | Brennan et al. | 141/98 |
| 5,528,880 A | * | 6/1996 | Landolt | 53/432 |
| 5,791,123 A | * | 8/1998 | Bolz | 53/434 |
| 5,810,060 A | * | 9/1998 | Bolz et al. | 141/97 |
| 5,881,535 A | * | 3/1999 | Gliniecki et al. | 53/410 |

(Continued)

FOREIGN PATENT DOCUMENTS

FR 2758540 A1 * 7/1998

(Continued)

OTHER PUBLICATIONS

"Preventing Occupational Exposure to Antineoplastics and Other Hazardous Drugs in Workplace Settings,"NIOSH, Pub. No. 2004-165, Sep. 2004, 48 pages.

(Continued)

*Primary Examiner*—Stephen F Gerrity
(74) *Attorney, Agent, or Firm*—Patents on Demand, P.A.

(57) ABSTRACT

The present invention discloses a solution for disposing waste having potentially hazardous airborne emissions. The solution can include a step of receiving waste through an aperture of a disposal unit exhibiting a closed environment. The received waste can be placed within an air tight disposal container. An opening of the disposal container can be sealed to separate the disposal container from the remainder of the substantially closed environment. Air included in the remainder of the substantially closed environment can be captured and placed in a holding unit. The captured air can be ejected from the holding unit into the air tight disposal container. The disposal container containing the received waste and the ejected air can be sealed. The disposal unit can be thereafter opened so that the sealed disposal container is able to be discarded.

15 Claims, 6 Drawing Sheets

U.S. PATENT DOCUMENTS

| | | | |
|---|---|---|---|
| 5,890,781 A * | 4/1999 | Ryder | 312/1 |
| 5,972,291 A * | 10/1999 | Healy et al. | 422/22 |
| 6,367,518 B2 | 4/2002 | Duncan | |
| 6,428,122 B1 * | 8/2002 | Henry et al. | 312/1 |
| 6,742,703 B2 | 6/2004 | Esakov et al. | |
| 6,997,313 B2 | 2/2006 | Rigling | |
| 7,017,306 B2 | 3/2006 | Ryder | |
| 7,114,629 B2 | 10/2006 | Panek, Jr. | |
| 7,174,602 B1 | 2/2007 | Foral | |
| 2001/0004182 A1 * | 6/2001 | Bennison | 312/1 |
| 2003/0038564 A1 | 2/2003 | Drinkwater | |
| 2005/0004537 A1 * | 1/2005 | Dunn et al. | 604/322 |
| 2006/0119232 A1 | 6/2006 | Tattershall | |
| 2009/0149689 A1 * | 6/2009 | Crawford et al. | 588/3 |

FOREIGN PATENT DOCUMENTS

| | | | |
|---|---|---|---|
| JP | 52144600 A | * | 12/1977 |
| JP | 03275422 A | * | 12/1991 |
| WO | WO 2004110867 A1 | * | 12/2004 |

OTHER PUBLICATIONS

Spivey, S.M., et al., "Determining Sources of Workplace Contamination with Antineoplastic Drugs and Comparing Conventional IV Preparation With a Closed System," Hospital Pharmacy, 38(2):135-139, dated 2003, 1 page.

"ASHP Guidelines on Handling Hazardous Drugs," Am. J. Health-System Pharm., 2006-63, 1172-93, dated 2006, 20 pages numbered 34-53.

* cited by examiner

SUBSTANTIALLY CLOSED SYSTEM FOR SAFELY DISPOSING POTENTIALLY HAZARDOUS MATERIAL

BACKGROUND

1. Field of the Invention

The present invention relates to the field waste disposal and, more particularly, to a substantially closed system for disposing hazardous material, which includes harmful airborne substances.

2. Description of the Related Art

The majority of trash receptacles include a lid, which is able to be opened, permitting waste to be placed inside. An interior bag of the trash receptacle is often able to be "tied" or otherwise manually sealed. Many types of refuse, however, can pose exposure hazards, which current trash disposal technologies fail to address. The hazards can result from airborne substances being emitted from waste during the disposal process.

This can be true, for example, in a medical context, where bed sheets, gowns, linen, drinking cups, and other material are disposed of, each of which can contain traces of blood, sweat, and other body fluids, which can be hazardous to others. For instance, chemotherapy patients are intentionally irradiated, which results in their fluids containing traces of radioactivity to which waste disposal personnel at hospitals are constantly exposed. Additionally, airborne pathogens can be especially problematic for waste disposal employees at hospitals, who have a much higher than normal rate of heath problems, presumably due to this constant exposure to hazardous material.

Other contexts where waste disposal practices are currently insufficient and/or dangerous include research lab waste disposal situations, toxic spill situations, generic hazmat situations, biological/chemical attacks in a terrorism/military situation, outbreak and epidemic situations, flooding and other national emergencies where mold, fungus, and other potentially harmful substances are to be expected, and the like.

Public concern over the proper treatment and disposal of chemical waste products has increased over the past several years. This increase is due in part to an increased public awareness of dangerous chemicals being exposed to the environment that can have deleterious effects when improperly disposed of from within hospitals, out-patient clinics, and physicians' offices. Despite this increased awareness within limited contexts, few effective measures are being taken to resolve underlying problems. For example, hospitals currently have established awareness programs designed to teach its personnel to handle potentially harmful materials with care. These programs are designed to appease public pressure, but not to address the fundamental problem that current waste disposal techniques pose a health risk regardless of a level of care taken. What is needed is a new type of waste disposal receptacle, which minimizes human contact with harmful wastes, which includes protection from airborne emissions.

SUMMARY OF THE INVENTION

The present invention provides a solution for safely disposing potentially hazardous materials in accordance with an embodiment of the inventive arrangements disclosed herein. The solution teaches an environmentally closed disposal container, which includes one or more sealable bags. Waste can be placed within the closed disposal container, where the waste fills a current opening of one of the sealable bags without exposing a handler to airborne emissions. Once placed in the container, the open bag can be sealed, without compromising the environmentally closed system. For example, sealed gloves can extend into the sealed container, which permit the handler to close and seal the open bag. Once the bag is closed and/or sealed, a pump can remove/filter the air from within the closed disposal container. In one embodiment, a bladder can be expanded to contain the air removed from the disposal container. An optional indicator can engage to alert the handler when the disposal system is "safe," at which point the sealed bag can be safely removed without harm to the handler. A unique feature of the claimed disposal system is that it is able to safely capture any and all volatile gases and airborne particles that may under traditional conditions emanate from the waste to harm a handler.

The present invention can be implemented in accordance with numerous aspects consistent with the materials presented herein. One aspect of the present invention can include a waste disposal unit comprising an approximately air tight chamber which is sufficiently air tight to ensure that harmful airborne byproducts of waste do not escape into an environment external to the waste disposal unit. Depending upon a type of waste being handled, a perfect air-tight seal is not needed, but a seal sufficient to prevent harm to a unit operator is acceptable. The unit can include an insertion component for inserting waste into the approximately air tight chamber. A distinct air tight region of the air tight chamber can contain a disposal container within which waste received via the insertion component is able to be placed. Another distinct region of the approximately air tight chamber can be an air holding region distinct from the air tight region and a remaining region of the approximately air tight chamber. The unit can include an air extraction unit configured to capture air from the remaining region and to place the captured air in the air holding region. The air extraction unit can further convey the captured air from the air holding region and place it within the air tight region (e.g., the disposal container). A manipulator for sealing the disposal container after the air extraction unit has conveyed air into it from the air holding region can also be part of the system. Once the disposal container has been sealed, the sealed container can be removed from the unit via a removal component.

Another aspect of the present invention can include a closed system for disposing of waste having potentially harmful airborne emissions. The closed system can include a sealable disposal chamber, an insertion tube, a set of tubing, an air pump, a manipulator, a removal component, and a set of user controls. The sealable disposal chamber can be configured to prevent an escape of the potentially harmful airborne emissions. The insertion tube can be used for inserting wastes and can include a one-way seal. The insertion tube can also include an opening for attaching an air tight waste disposal bag. When the air tight waste disposal bag is connected to the opening, the bag can form an air tight boundary between itself and a remainder of the sealable disposable chamber. The tubing can have sealable openings into the remainder of the sealable disposal chamber, into the insertion tube, and into an air holding region. The air pump can be connected to the set of tubing. One user control can activate the pump to convey air from the remainder of the sealable disposal chamber into the air holding region. Another user control can activate the pump to convey air from the air holding region to the sealable disposal chamber. The manipulator can permit a sealing of the sealable disposal chamber while the sealable disposal chamber is sealed. The removal component can permit sealed ones of the disposal containers to be safely removed from the closed system.

Still another aspect of the present invention can include a method for disposing waste. The method can include a step of receiving waste through an aperture of a disposal unit having a substantially closed environment. The received waste can be placed within an air tight disposal container. An opening of the disposal container can be sealed to separate the disposal container from a remainder of the substantially closed environment. Air included in the remainder of the substantially closed environment can be captured and placed in a holding unit. The captured air can be ejected from the holding unit into the air tight disposal container. The disposal container containing the received waste and the ejected air can be sealed. The disposal unit can be thereafter opened so that the sealed disposal container is able to be discarded.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
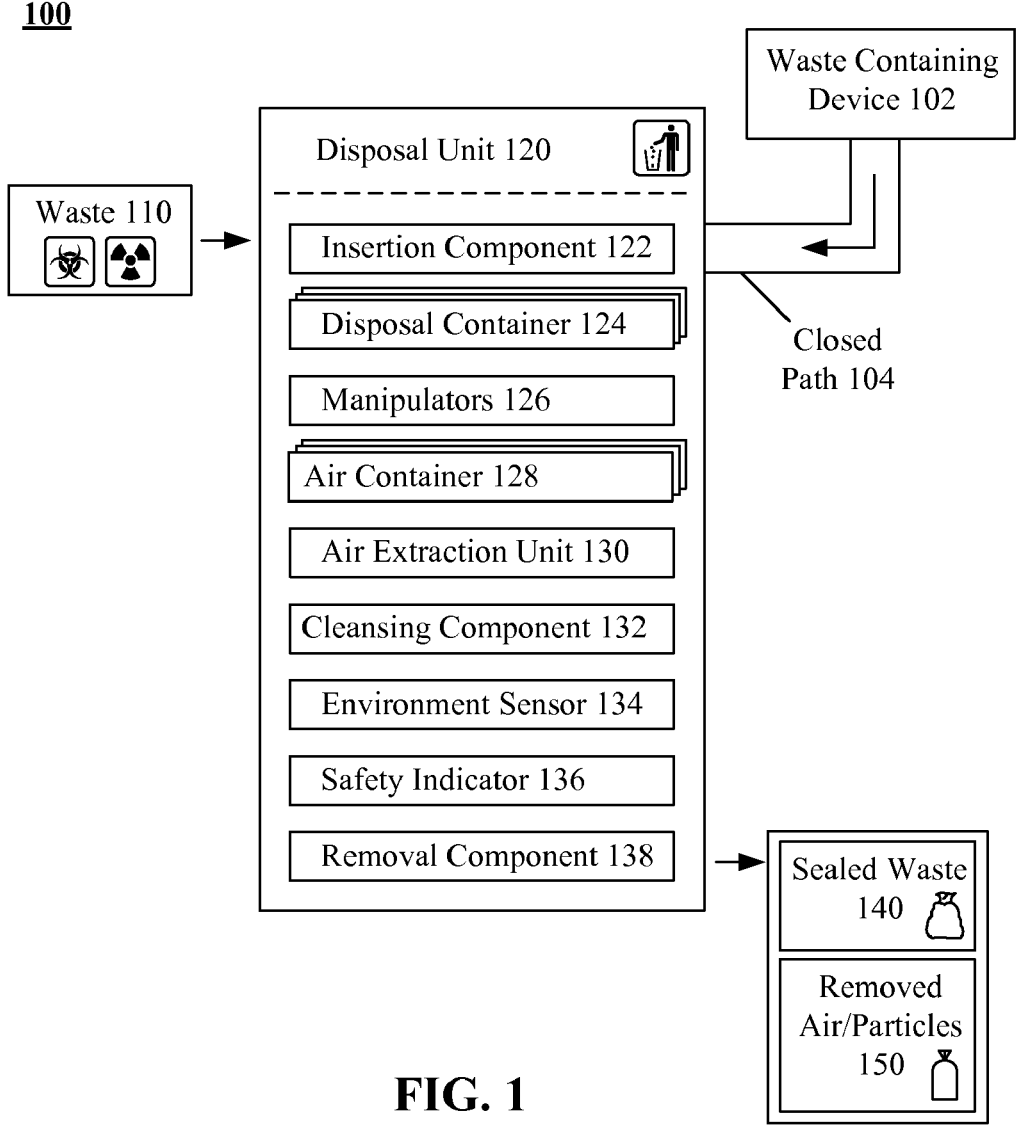
FIG. 1 is a schematic diagram of a waste disposal system for safely disposing potentially hazardous material in accordance with an embodiment of the inventive arrangements disclosed herein.

FIG. 1 is a schematic diagram of a waste disposal system 100 for safely disposing potentially hazardous material in accordance with an embodiment of the inventive arrangements disclosed herein. As shown, waste 110 can be placed within a disposal unit 120 through an insertion component 122. In one embodiment, a closed path 104 can exist between an external waste containing device 102 and the disposal unit 120 to minimize handler contact/exposure with the waste 110. The closed path 104 can include numerous directional components, specifics of which vary based upon a type of waste 110 being moved from device 102 to unit 120. For example, when the waste 110 consists of airborne particles, powders, etc, the closed path 104 can include a directional ventilation system for directing air/small particles. When the waste 110 is liquid, the closed path 104 can include plumbing. When the waste 110 is solid, the path 104 can include a conveyor belt or other mechanical conveyance mechanisms, such as a gravity based disposal shoot terminating in the unit 120. When waste 110 is unknown or non-uniform, suitable combinations of path 104 components can be utilized to handle any type of waste 110.

The unit 120 itself can be a substantially closed system, designed to permit complete waste 110 containment. For example, when the waste 110 can include airborne particles, the unit 120 can be a closed, air-tight system designed to prevent an escape of airborne particles. The insertion component 122 can include a one-way valve and/or insertion mechanism that ensures the waste 110 is sealed once placed in unit 120. Unit 120 can include multiple disposal containers 124 for placing the waste, which are sealable to prevent waste 110 from escaping once contained. One or more manipulators 126 can permit the container 124 and/or waste 110 manipulation within a closed environment of the disposal unit 120. After waste 110 has been placed in a removable, sealable container 124 from within the closed environment of unit 120, the container can be sealed.

Once the container 124 is sealed, an air extraction unit 130 can remove airborne particles or other potentially dangerous trace elements from unit 120. The removed air can be placed within an air container 128. The air container 128 can be a separate container from container 124. In another implementation, the disposal container 124 can be an air tight container that also functions as container 128. In still another implementation, container 128 can be a separately sealed container included inside container 124. Of course, using the disposal container 124 to contain air can alter an order in which the container 124 is sealed relative to when unit 130 extracts air from unit 120.

The unit 120 can optionally include an additional cleansing component 132, such as a component that sprays a sanitizing liquid into the interior of unit 120 to ensure the unit 120 is free of waste 110. Unit 120 can also include one or more optional environment sensors 134 designed to detect when unit 120 is free from harmful waste 110. The sensor 134 can be linked to a removal component 138 so that the removal component 138 is unable to be opened until the interior environment of unit 120 is safe. An optional safety indicator can 136 provide an indicator as to conditions determined by one or more sensor 134. For example, indicator 136 can display text concerning radiation levels, airborne pathogen levels, and other important metrics concerning an interior of unit 120. In another example, the indicator 136 can be implemented as a light providing a warning when it is safe/unsafe to open the unit 120. The removal component 138 can be a component through which the sealed waste 140 and/or removed air/particles 150 are able to be safely removed.

System 100 can be configured/adapted for any situation involving 110 waste disposal. Some originally solid waste 110 is burned, compacted, rendered inert, or otherwise processed during the disposal process. Processing components can be added to unit 120 so that these disposal processes can be performed in a closed environment in a manner safe for a human handler or operator of unit 120.

It should be appreciated that the details for efficiently and economically implementing system 100 can vary according to a usage situation. One important feature to note of system 100 is its ability to establish a closed environment within container 120, where received waste 110 is converted into sealed waste 140 without exposing a handler to hazards of the waste 110. For instance, the unit 120 can capture any and all volatile gases, airborne particles, pathogens, biological hazards, chemicals, offensive smells, and the like within the closed environment.

In one configuration, system 100 can have hospital outpatient clinic, pharmacy, and physicians' office applications. In such applications, it can provide a safety feature by securely allowing the disposal of chemically tainted materials while simultaneously capturing volatile and noxious gases that may be construed as not being present. The system 100 can be configured to satisfy numerous regulations, such as those of United States Pharmacopeia (USP) 797. In contrast, pre-existing waste disposal systems fail to resolve issues of volatile gases and its effects on the environment. Conventionally utilized High Efficiency Particulate Air (HEPA) filters do not impede such volatile gases. Furthermore, use of conventional biological glove boxes do not sufficiently address aerosolized gases except to otherwise vent them into the environment to be further diluted with the air. Unlike other solutions, system 100 can allow hospital produced byproducts (e.g., chemotherapy byproducts and residual volatile gases, for example) to be collected, captured, and then incinerated. Thus eventually rendering the materials innocuous to the surrounding environment.

It should be appreciated that system 100 is not limited to health care applications. In one contemplated configuration, system 100 can be adapted for household use, preventing smells from coming out of garbage bags. System 100 can also be adapted for commercial food industries such as for kitchens of ships, aircrafts, cruise liners, tour buses, restaurants, and trains. A further application for system 100 is for handling industrial waste, such as wastes produced by chemical refineries, industrial cleaner containment, manufacturing byproducts, and the like. Moreover, system 100 can be used for disaster cleanup, such as for flood cleanup, hurricane cleanup, and the like, where often unknown and potentially hazardous materials must be discarded in volume.

Subsequent figures of the application (FIGS. 2 through 6) provide a complete embodiment for a waste disposal unit, where solid wastes are generated, which have potentially hazardous airborne components. Consequently, the containment unit/system of this embodiment is designed to dispose of waste in a closed environment, to seal a container containing waste, and to clear the air within the closed environment before permitting the disposal environment to be opened for removal of the sealed waste. The specifics provided for this embodiment are to illustrate a concept only and the invention is not to be limited to the detailed specifics.

For example, the specifics show a containment unit where gloves are used as manipulators 126. Derivative embodiments where other manipulators, such as mechanical manipulators and/or robotic arms are contemplated. In another example, an insertion component for receiving waste is shown as a tube, which in other contemplated embodiments can be implemented as a revolving door in which a seal is maintained, a sliding aperture, and the like. Further, the containment unit shown in FIGS. 2 through 6 is shown as square, but other shapes, can be utilized and may be better suited depending upon application. Accordingly, specifics of FIGS. 2 through 6 are to be interpreted as a specific instance of FIG. 1, where other instances for the disposal unit 120 consistent with the claims expressed herein are contemplated. Any adaptation to details of the system 100 (or the specific system of FIGS. 2 through 6) are contemplated, including known adaptations for specially handling of specific types of wastes 110, such as flammable wastes, corrosive wastes, biological wastes, radioactive wastes, and the like.

Figure 2:
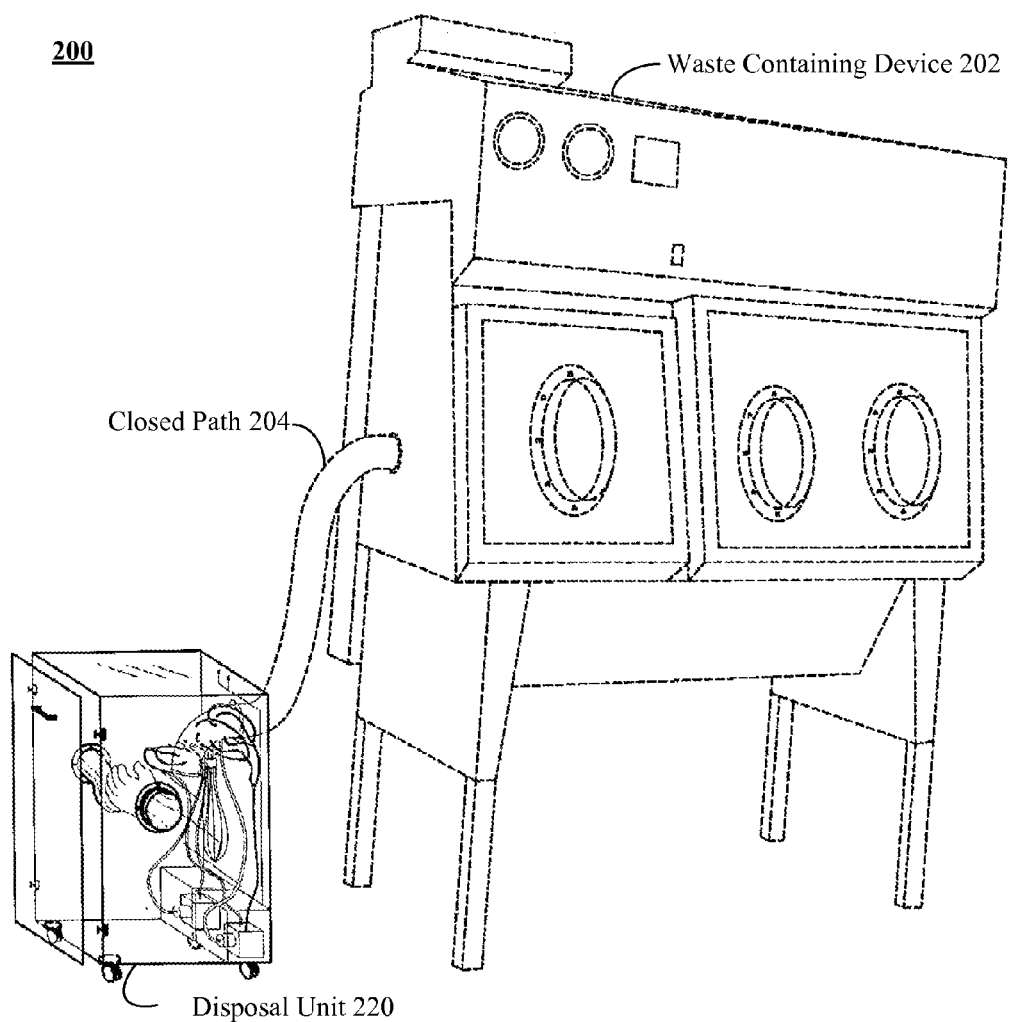
FIG. 2 shows a system that includes a waste containing device, which is connected to the disposal unit via a closed path.

FIG. 2 shows a system 200 that includes a waste containing device 202, which is connected to the disposal unit 220 via a closed path 204. Specifically, the device 202 can be a chemical fume hood. A pre-existing, commercial-off-the shelf chemical hood can be adapted to include disposal unit 220. For example, instead of permitting the air/particles contained within a hood (device 202) to be ejected to an environment after an optional filtering step, the emissions can be conveyed along the closed path 204, to the unit 220. The unit 220 can process hood (202) emissions and safely discard them.

In one embodiment, an auto-cleaning feature can be used to rinse/sweep chemicals from device 202, along the path 204, where they are safely discarded/handled by unit 220. The unit 220 can optionally include a one-way aperture, where users of device 202 can also discard waste. In a different implementation, the disposal unit 220 and/or disposal features of unit 220 can be integrated into device 202 to create a single, integrated device, through which chemicals and other byproducts can be safely discarded.

Figure 3:
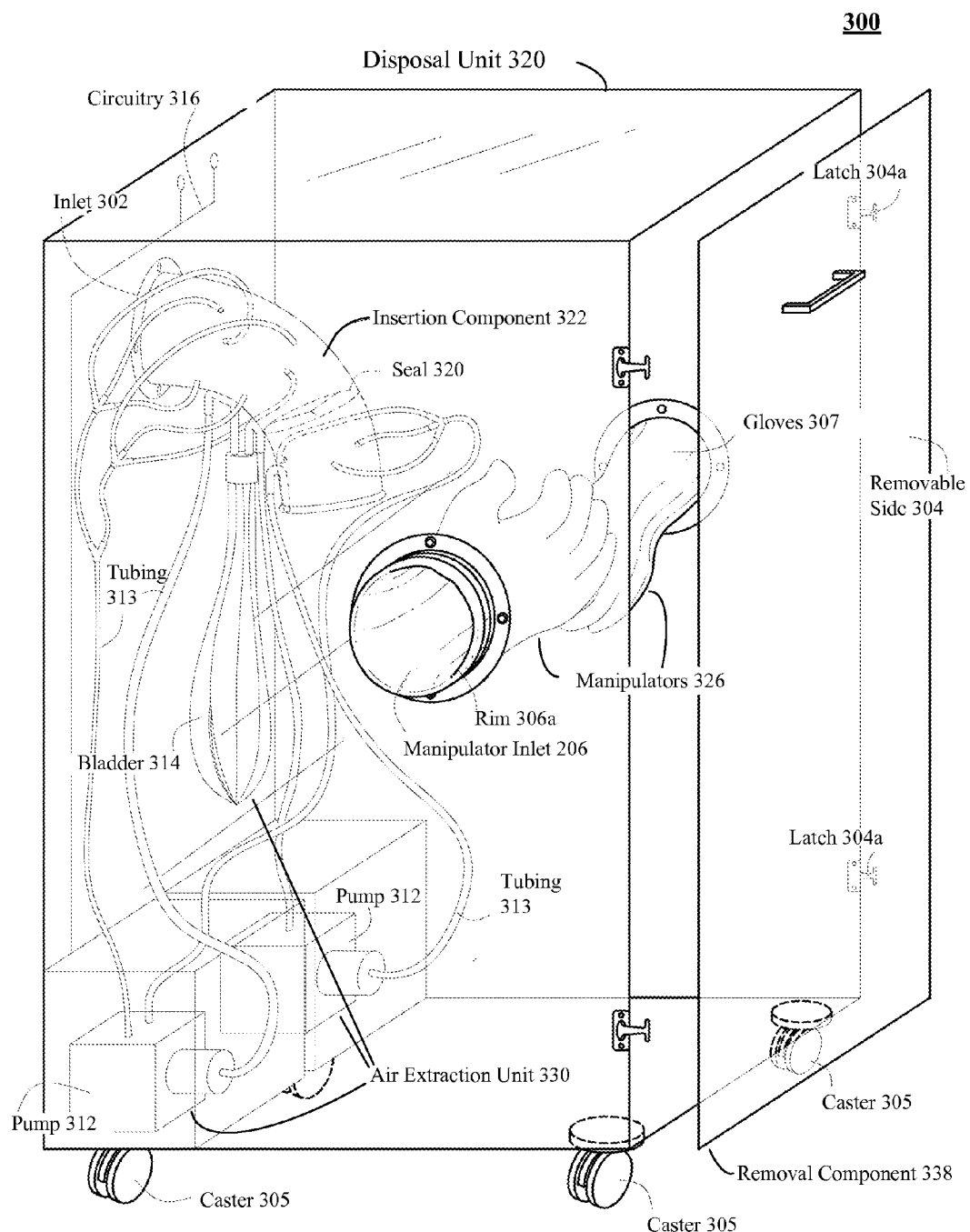
FIG. 3 is a schematic diagram of a specific instance of a disposal unit, such as unit of FIG. 1.

FIG. 3 is a schematic diagram of a specific instance 300 of a disposal unit 320, such as unit 120 of FIG. 1 or unit 220 of FIG. 2. In implementation instance 300, an inlet 302 can be part of an insertion component 322 for receiving waste, which can be terminally connected to a disposal container, such as a sealable trash bag. Manipulators 326 can be used to position the disposal container about the insertion component. The insertion component 322 can include a one-way seal 320 to help contain inserted waste and to ensure harmful byproducts from inserted waste are not discharged.

Air extraction unit 330 can consist of one or more pumps 312 connected to the insertion component 322 via tubing 313. An air bladder 314 can inflate to pull air from an environment of unit 320. Once full, and once an air-tight disposal container (e.g., bag) is connected to the insertion component 322, the bladder 314 can release captured air/particles into the disposal container (or other container, such as a separate air containment unit/air reclamation component). After the air is injected into the disposal container, it can be sealed via the manipulators 326, which in one embodiment can be a set of rubberized gloves 307. Once sealed, the removable side 304 can be detached to permit the now sealed disposal container to be removed.

As illustrated in instance 300, the surfaces of contact between the side 304 and the perimeter of the unit 320 can be covered along the curves by a foamy or other sealing material (omitted in the drawings) that ensures air tight sealing while the environment of unit 320 is closed.

In one of the embodiment a bottom of the unit 320 can include a set of casters 305 annealed or secured on each corner allowing the end user to roll the unit 320 around as needed. Perpendicular to the surface with the castors 305, can be a surface that has four latches. Two latches 304a can be positioned on one side of the unit 320 and the other two latches 304a are on the opposite side. During normal operations these latches 304a can be pulled back. When the operator is required to remove the side 304 completely and remove the said solid waste bag, the latches 304a can be released forward.

Further illustratively in one of the embodiments of the claimed invention the inlet 302 can be a downward arc shaped tube. Two of the sides of the unit 320 can have an opening inlet featuring a rim 306a, preferably a steel rim, affixed to said waste collection bin with a lip shaped in a way to allow rubber gloves 307 to be inserted inside and around the inside of the cylindrical lip of the unit 320. These gloves 307 can be manipulators 326 that permit an operator to insert their hands and tie a bag containing said solid waste without coming into contact of the inside of the unit 320, which remains in a closed state while the gloves 307 are utilized.

A vacuum can be generated by a vacuum pump 312 connected to a plurality of non-collapsible vacuum quality tubing 313 that in turn supports a low pressure environment inside the possibly metallic cylindrical tube. Inherent in the tubing 313 can be check valves (omitted in the drawings), which prevent air from seeping back to its original origin. The outlet of the vacuum pump 312 can be connected to an air bladder 314 where the air sucked in by the pump 312 is ultimately collected.

The vacuum pump 312 can be installed on the inside of the disposal unit 320 located at the bottom in one corner of the floor of the unit 320, although exterior mounting of the pumps 312 and other positions are also possible. Each pump 312 can be connected to a power source, such as an 115v, 230v, or DC source. A contemplated range of delivery for the pump 312 in one embodiment can be between 0.5 Liter/min to 20 Liter/min.

Pressure of the air in the bladder 314 can be monitored by a pressure gauge, such that in one of the illustrative embodiments of the claimed invention lights or other warning indicators can alert users when the air lines 313 or air bladder 314 become compromised (when pressure is unexpectedly lost).

As shown in instance 300, the air bladder 314 can be attached to the bottom portion of the metallic cylinder tube, approximately equidistant between both openings. The air bladder 314 can be connected with the solid waste bin by a vacuum quality non-collapsible tubing system 313. Controls of the unit 320 can regulate a gas flow between the air bladder 314 and the solid waste disposal bag. When a user selectable control is pressed, the vacuum system can be redirected by the means of a plurality of tubes 313, valves, switches, and connections, so that the air flow is directed from the air bladder 314 to the waste bag.

A function of the air bladder 314 can be to capture any noxious gas originated by the waste introduced through the initial aperture 302 and to hold the waste/particles/airborne pathogens until the possibly tainted air can be redirected to the waste bag, which is then finally removed and incinerated. Instance 300 is novel over conventional systems as it is a closed systems where vapors, gases, dust, odors, airborne pathogens, and the like are temporarily stored and re-directed to the waste bin without exposing the exterior environment or a waste handler. Sealed waste can be handled safely in accordance with any applicable guidelines, such as Federal Guidelines for incinerating chemotherapy resulting waste.

It should be appreciated that a specific application of instance 300 for healthcare professionals in a hospital or an out-patient clinic, engaging in chemotherapy or other wastes can be profound. There is currently no appropriate protection when disposing of chemotherapy contaminated waste in bins that are not sealed or lids that remain ajar. As a result, noxious and volatile gases can seep out in to the surrounding environment and render the health care professional compromised and subject to various health concerns. The main function of the air bladder 314 is to act as a staging area to hold contaminated air and store it until the chemotherapy waste bag is ready to be changed, at which time the air bladder 314 can be evacuated into the chemotherapy waste bag by selecting a user accessible control.

Figure 4:
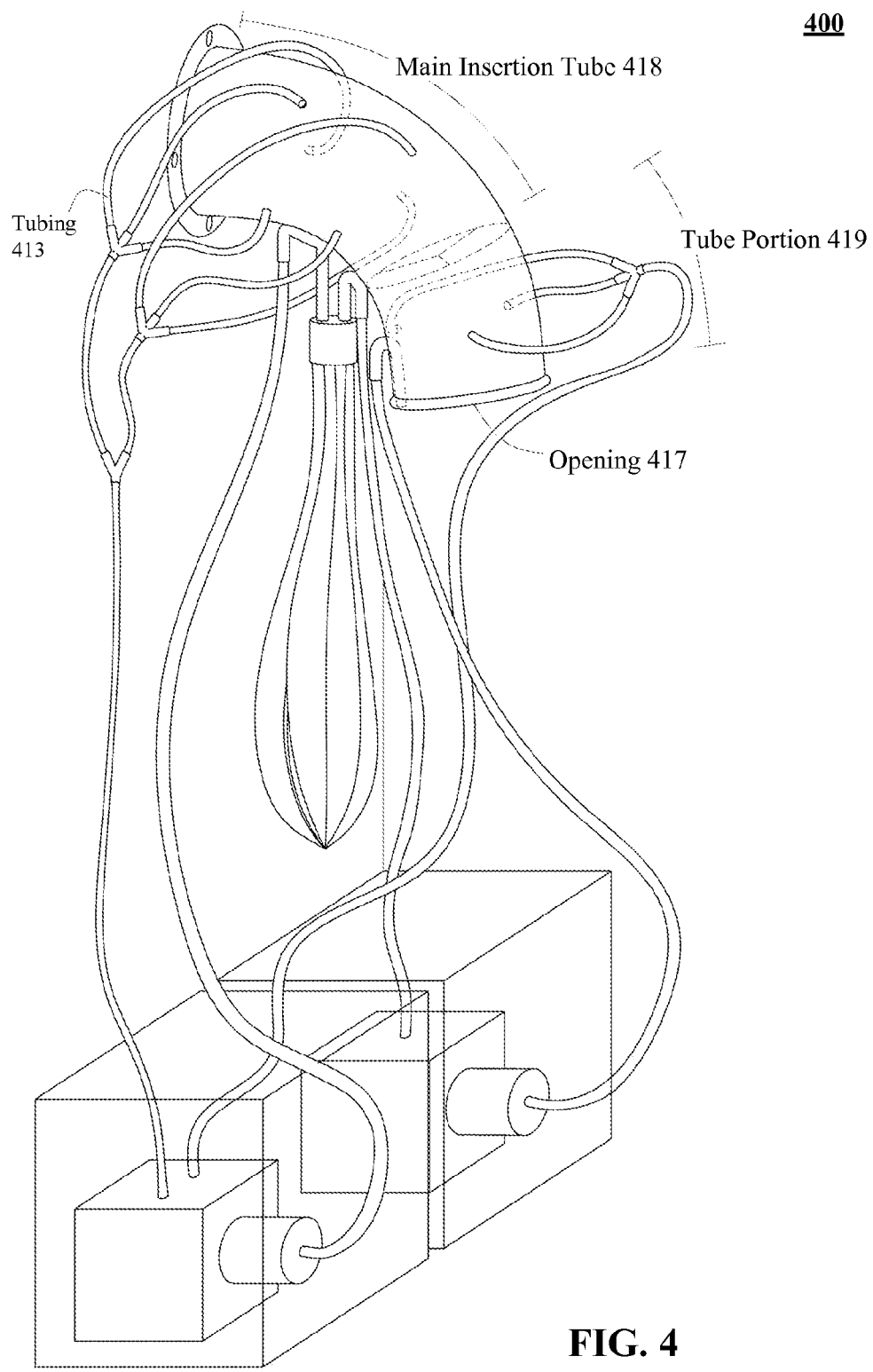
FIG. 4 provides a more detailed view of the closed vacuum system of the disposal unit of FIG. 3.

FIG. 4 provides a more detailed view 400 of the closed vacuum system of the disposal unit 320. Specifically, view 400 shows the tubing 413, which is connected to the main insertion tube 418 and the bladder. Tube portions 419 can be positioned on both sides of a seal 415 contained within the insertion tube 418 to help direct air flow. The opening 417 can be sealed to a disposal container, such as a sealable, air-tight waste bag.

Figure 5:
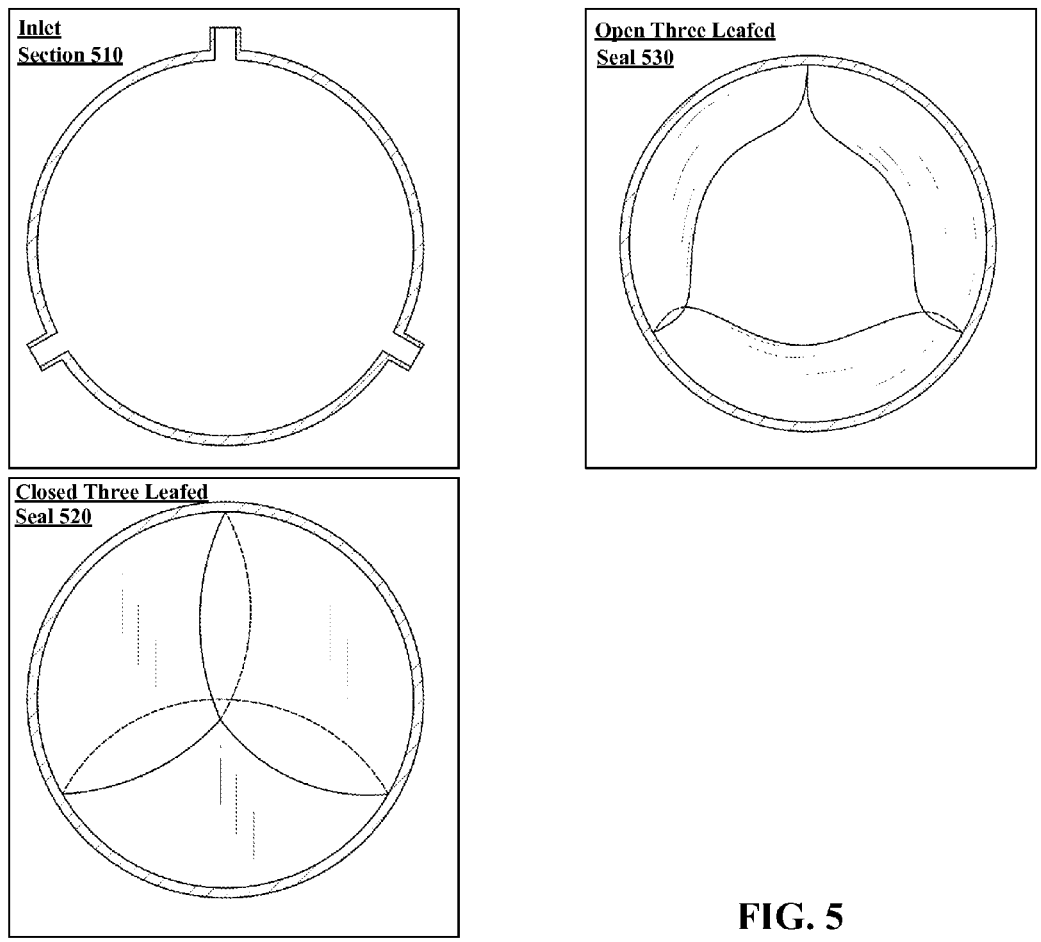
FIG. 5 shows a cross sectional view of an insertion tube of the disposal unit shown in FIG. 3.

FIG. 5 shows a cross sectional view 510 of an insertion tube of the disposal unit shown in instance 300. Additionally, views for a closed seal 520 and an open seal 530 are shown. The represented seal 520, 530 can be the seal 415 contained within an insertion tube of the disposal unit.

Figure 6:
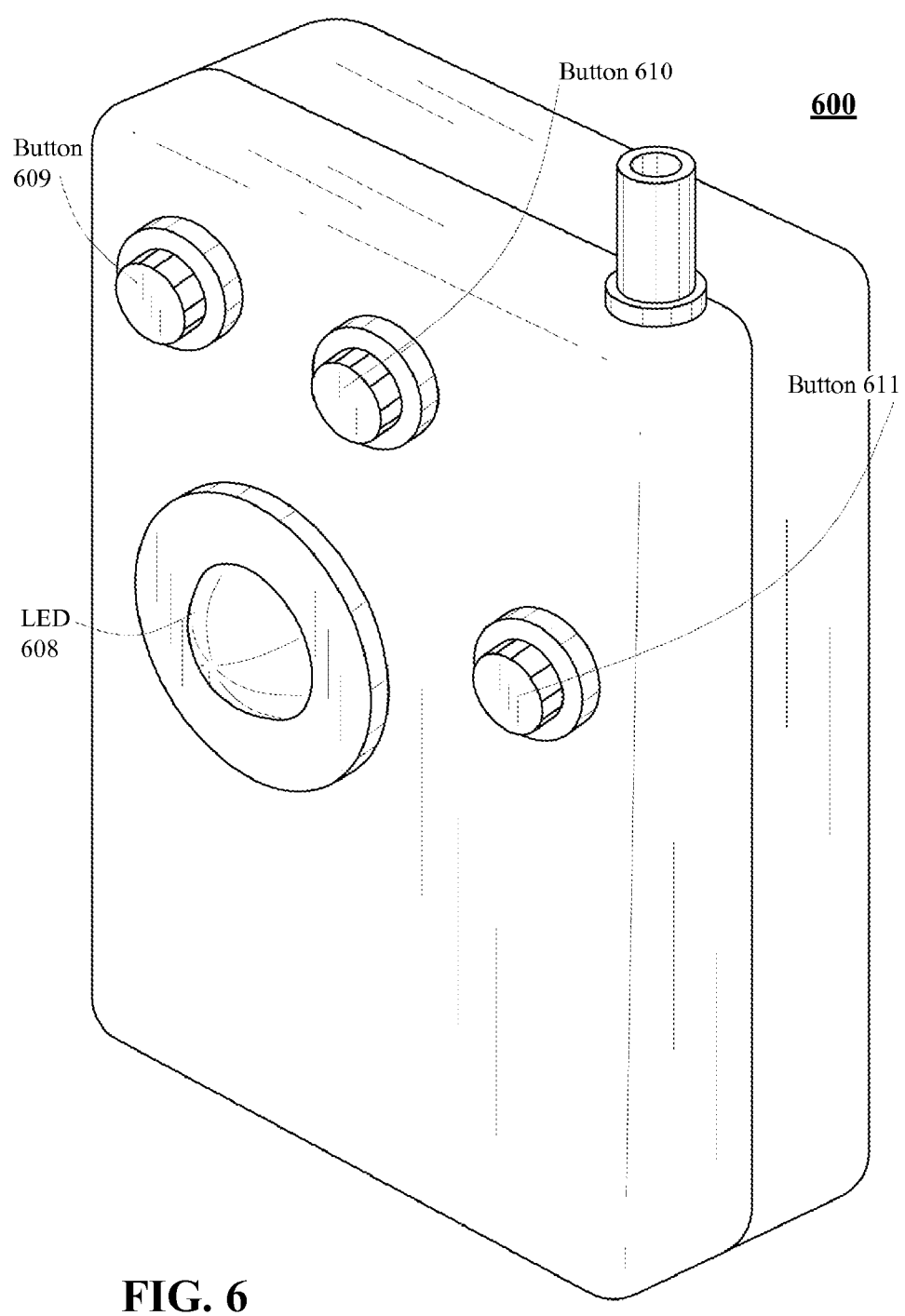
FIG. 6 illustrates a control unit for a disposal unit.

FIG. 6 illustrates a control unit 600 for a disposal unit, such as the disposal unit 120 of FIG. 1, unit 220 of FIG. 2, and/or unit 320 of FIG. 3. The control unit can include a set of user selectable controls, such as buttons 609, 610, and 611. Button 609 can cause air within a disposal unit to be temporarily contained (e.g., can inflate bladder 314 or actuate a similar component). Button 610 can cause temporarily captured air (e.g., air within an inflated bladder 314) to be conveyed into a disposal container (e.g., a sealable, airtight, trash bag). Button 611 can capture any escaped air, once a disposal bag has been sealed and before an operator opens the previously closed system of the waste disposal unit. LED indicator 608 can represent a warning light, which can indicate various system concerns, such as a presence of harmful substances within an environment of the disposal unit, a potential leakage in the air system of the disposal unit, and the like.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for carrying out methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A disposal unit comprising:
   an approximately air tight chamber;
   an insertion component for inserting waste into the chamber;
   an air tight region of the air tight chamber containing a disposal container within which waste received via the insertion component is able to be placed;
   an air holding region distinct from the air tight region and a remaining region of the approximately air tight chamber;
   an air extraction unit configured to capture air from the remaining region and to place the captured air in the air holding region and further configured to convey air from the air holding region and place the captured air within the disposal container; and
   at least one manipulator for sealing the disposal container after the air extraction unit has conveyed air into the disposal container from the air holding region.

2. The disposal unit of claim 1, wherein the disposal container is an air tight bag.

3. The disposal unit of claim 1, wherein said at least one manipulator comprises at least one sealed glove through which a user of the disposal unit is able to insert his/her hands to seal the air tight bag.

4. The disposal unit of claim 1, further comprising:
at least one environment sensor configured to detect whether the remaining region contains harmful airborne byproducts of inserted waste; and
at least one safety indictor configured to notify a user of the disposal unit when a quantity of one or more byproducts detected by the at least one environment sensor exceeds a previously established threshold.

5. The disposal unit of claim 1, further comprising:
a removal component configured to have at least an open state and a closed state, wherein when in the closed state the approximately air tight chamber is approximately air tight, and wherein when in an open state, the approximately air tight chamber is not air tight, wherein when the removal component is in the open state, a disposal container included in the disposal unit is able to be removed.

6. The removal component of claim 5, wherein the removable component is a removable pane of the disposal unit.

7. The disposal unit of claim 1, further comprising:
a closed vacuum system inside the air tight chamber, which is connected to the air extraction unit and to the insertion component, said closed vacuum system comprising a set of non-collapsible tubing through which air is moved to create differences in pressure inside the approximately air tight chamber to convey air to/from the air holding region.

8. The disposal unit of claim 1, wherein said air holding region comprises an air bladder contained within the disposal unit, wherein when the air is captured from the remaining region the air bladder expands, and wherein when air is conveyed to the disposal container the air bladder contracts.

9. The disposal unit of claim 1, further comprising:
a user selectable control for extracting air from the remaining region and placing the extracted air into the air holding region; and
a user selectable control for extracting the air from the air holding region and placing it in the disposal container.

10. The disposal unit of claim 1, further comprising:
a closed path connecting the disposal unit to an external waste containing device, wherein waste is able to be conveyed through the closed path from the external waste containing device to the disposal unit.

11. The disposal unit of claim 10, wherein the external waste containing device comprises a chemical fume hood.

12. The disposal unit of claim 1, wherein said disposal unit is configured for a health care context and is used for disposal of hazardous materials and their airborne byproducts present in a health care setting including disposal of chemotherapy byproducts.

13. The disposal unit of claim 1, wherein said disposal unit is an odorless household waste disposal unit, wherein the air holding region captures smells and ejects them into a sealable disposable container before a sealed disposal container is removed from the disposal unit.

14. A closed system for disposing of waste having potentially harmful airborne emissions comprising:
a sealable disposal chamber configured to prevent an escape of said potentially harmful airborne emissions;
an insertion tube for inserting wastes, wherein said insertion tube comprises a one-way seal, and wherein said insertion tube comprises an opening for attaching an air tight waste disposal bag, wherein when the air tight waste disposal bag is connected to the opening, the bag forms an air tight boundary between itself and a remainder of the sealable disposable chamber;
a plurality of tubing having at least one sealable opening into the remainder of the sealable disposal chamber, having at least one sealable opening into the insertion tube, and having at least one sealable opening into an air holding region;
at least one air pump to which said plurality of tubing connects;
a user control for activating said pump to convey air from the remainder of the sealable disposal chamber into said air holding region;
a user control for activating said pump to convey air from the air holding region to the air tight waste disposal bag;
a manipulator configured to permit a sealing of the air tight waste disposal bag while the sealable disposal chamber is sealed; and
a removal component configured to permit sealed ones of the air tight waste disposal bags to be removed.

15. The closed system of claim 14, wherein said disposal unit is configured for a health care context and is used for disposal of hazardous materials and their airborne byproduces present in a health care setting including disposal of chemotherapy byproducts.

* * * * *